J. SCHUETTE.
PIPE JOINT.
APPLICATION FILED FEB. 20, 1922.

1,420,670. Patented June 27, 1922.

Inventor
Johann Schuette,
By Blackwood Bros,
Attorneys.

UNITED STATES PATENT OFFICE.

JOHANN SCHUETTE, OF ZEESEN-KOENIGS-WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

PIPE JOINT.

1,420,670.      Specification of Letters Patent.    Patented June 27, 1922.

Original application filed April 25, 1919, Serial No. 292,767. Divided and this application filed February 20, 1922. Serial No. 537,663.

*To all whom it may concern:*

Be it known that I, JOHANN SCHUETTE, residing at Zeesen-Koenigs-Wusterhausen, near Berlin, Germany, a citizen of the Republic of Germany, have invented certain new and useful Improvements in Pipe Joints; and I do hereby declare the following to be a full, clear, and exact description of the invention, such as will enable others skilled in the art to which it pertains to make and use the same, this being a division from an application for a patent upon improvements in pipe joints filed by me on April 25, 1919, bearing Serial No. 292,767.

My invention relates to improvements in joints or couplings for connecting pipes or tubes which are formed into girders, braces, and other similar parts of framed structures, such as the framing of rigid airships, and is intended to permit the connection of such tubes or pipes by means of rivets in cases in which access to the interior of the tubes or pipes is difficult or impracticable.

In joining or connecting the tubular members of the framing of rigid airships and similar structures it is desirable to bring the tubular members which are to be connected into line axially with each other and to insert an intermediate sleeve or connecting member of suitable diameter into the ends of the tubular members which are to be connected. This sleeve, or intermediate connecting member is then secured to the tubular members by means of rivets. When the interior of the tubular members is difficult of access, by reason of the small internal diameter of said tubular members, or because of the situations of the said tubular members with relation to the rest of the structure, it is desirable to perform the operation of riveting wholly or partially from the outside of the tubular members, and it is the object of my invention to facilitate this operation of riveting under these conditions.

Figure 1:
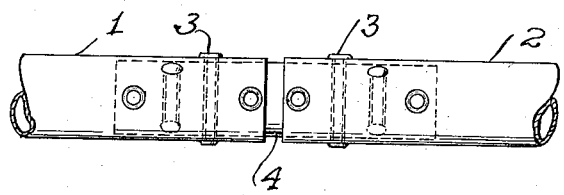
Figure 2:
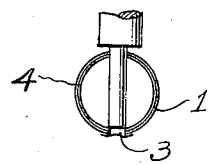
Figure 3:
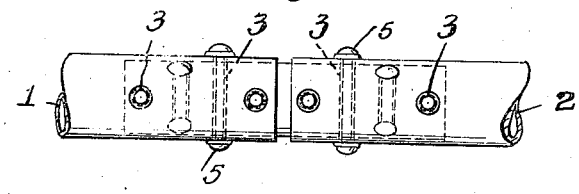
Figure 4:
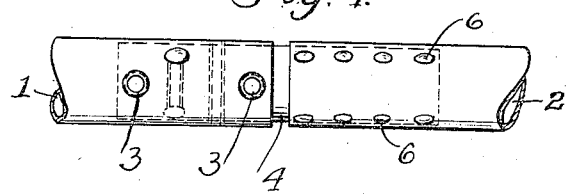

Referring to the illustrations, in which similar reference numbers indicate similar parts, Fig. 1 represents in elevation the connection of two tubular members by means of an intermediate sleeve, secured by tubular or hollow rivets. Fig. 2 represents one of the tubular members and the intermediate sleeve in cross section during the operation of riveting. Fig. 3 shows a connection similar to that of Fig. 1, with the addition of solid rivets inserted through the hollow or tubular rivets. Fig. 4 shows a joint similar to that shown in Fig. 1 with the exception of the fact that one end of the intermediate sleeve has been riveted to one of the tubular members by solid rivets, inserted prior to the insertion of the intermediate sleeve into the other tubular member, the latter only being secured by hollow or tubular rivets.

In Fig. 1 the two tubular members to be connected are shown at 1 and 2. At 4 is shown the intermediate sleeve, inserted into the ends of the tubular members 1 and 2. At 3—3—3 are shown tubular or hollow rivets, extending entirely through the tubular members and through the intermediate sleeve, and riveted or flanged over on the outside of the tubular members 1 and 2, the holes through which these tubular rivets are passed being bored or drilled through the tubes and intermediate sleeve in position to register with each other.

In Fig. 2 the tubular or hollow rivet 3 is shown passing through the registering holes in the tubular member 1 and intermediate sleeve 4, and the operation of flanging the head of the tubular rivet 3 is shown as completed.

In Fig. 3 the joint or connection is shown as further developed over that of Fig. 1 by the insertion of solid rivets 5—5, through the hollow rivets 3—3, giving additional strength to the connection or joint.

In Fig. 4 the intermediate sleeve 4 is shown secured to the tubular member 2, by means of solid rivets 6—6, while the tubular member 1 is secured to the same intermediate member by means of hollow rivets 3—3, in a manner similar to that shown in Figs. 1 and 2.

By using tubular rivets of sufficient length to extend entirely through the tubular members 1 and 2, the operation of flanging may be conducted wholly from the outside of said tubular members. The use of solid rivets primarily in such a manner is undesirable because of the liability of such rivets to bend in the operation of riveting. This liability to bend is obviated when tubular rivets are first used to make the connection, and the solid rivets are subsequently inserted through said tubular rivets, as shown in Fig. 3.

I am aware that tubular or hollow thimbles of fittings have been used to make a smooth lining or fitting in holes through the walls of vessels or containers, and I do not claim broadly the use of such thimbles or tubular fittings. My invention, on the contrary, relates to the uniting of two or more members together to form an assembled structure, in the manner above specified.

I claim:

1. A joint comprising two members to be secured together, one of said members being tubular; hollow rivets, passing diametrically across the tubular member and the other member, and flanged or headed on the exterior of the tubular member.

2. A joint comprising two members to be secured together, one of said members being tubular; hollow rivets passing diametrically across the tubular member and the other member to be headed from the exterior of the tubular member; and solid rivets passing through the hollow rivets, and also headed on the exterior of the tubular member.

3. A joint comprising two members to be secured together, a coupling member intermediate to the first named members, one of the latter members being tubular; solid rivets securing one of the first named members to the coupling member; and hollow rivets securing the other of the first named members to the coupling member.

4. A joint comprising a plurality of members to be secured together, hollow rivets crossing said members, and flanged or headed on the exterior of said members.

In testimony whereof I have affixed my signature.

JOHANN SCHUETTE.